B. O. FANSLOW.
CHECK WRITER.
APPLICATION FILED DEC. 11, 1916.
1,368,912.
Patented Feb. 15, 1921.
4 SHEETS—SHEET 1.
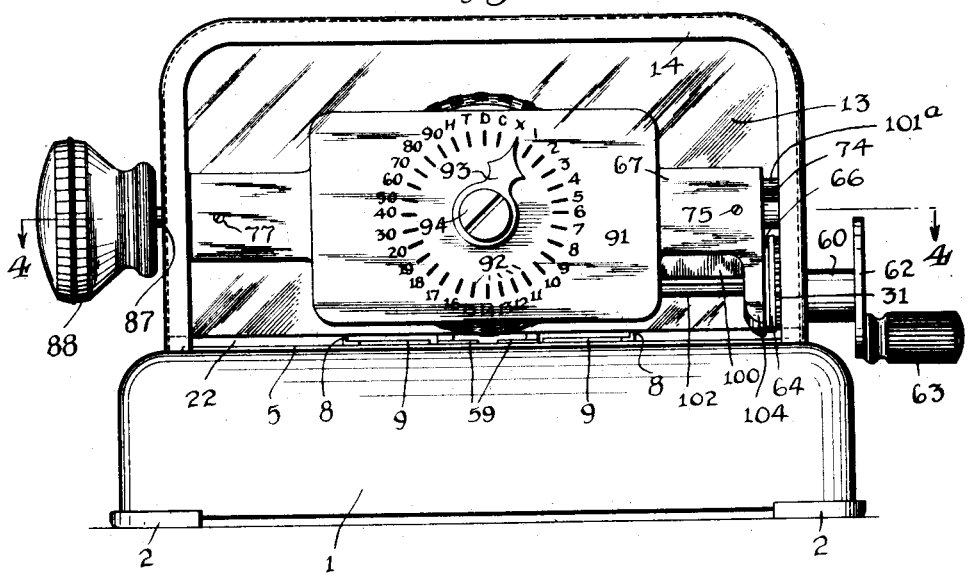
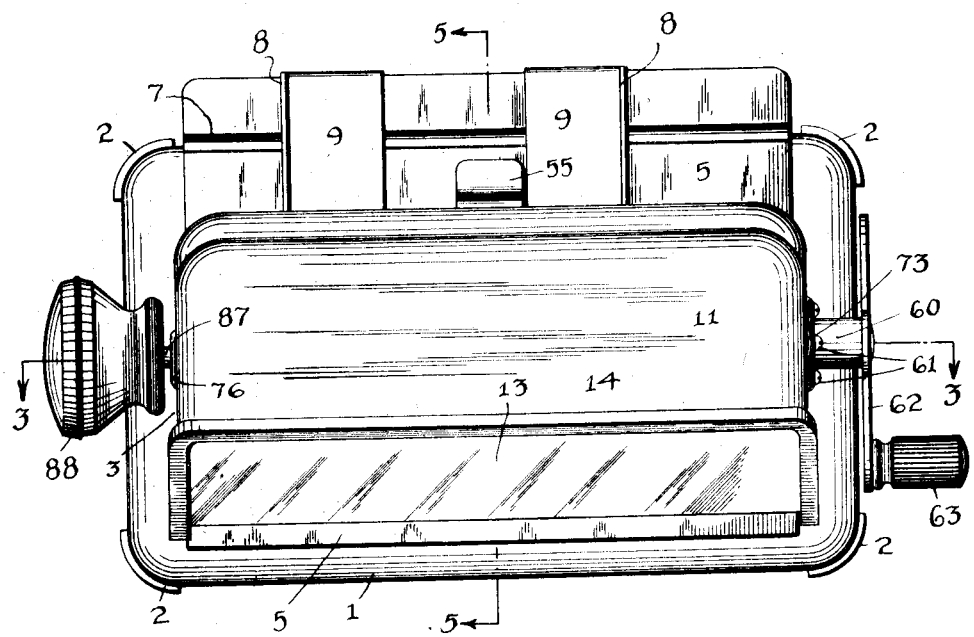
INVENTOR:
Benjamin O. Fanslow.
BY Chas. M. Chapman,
ATTORNEY.

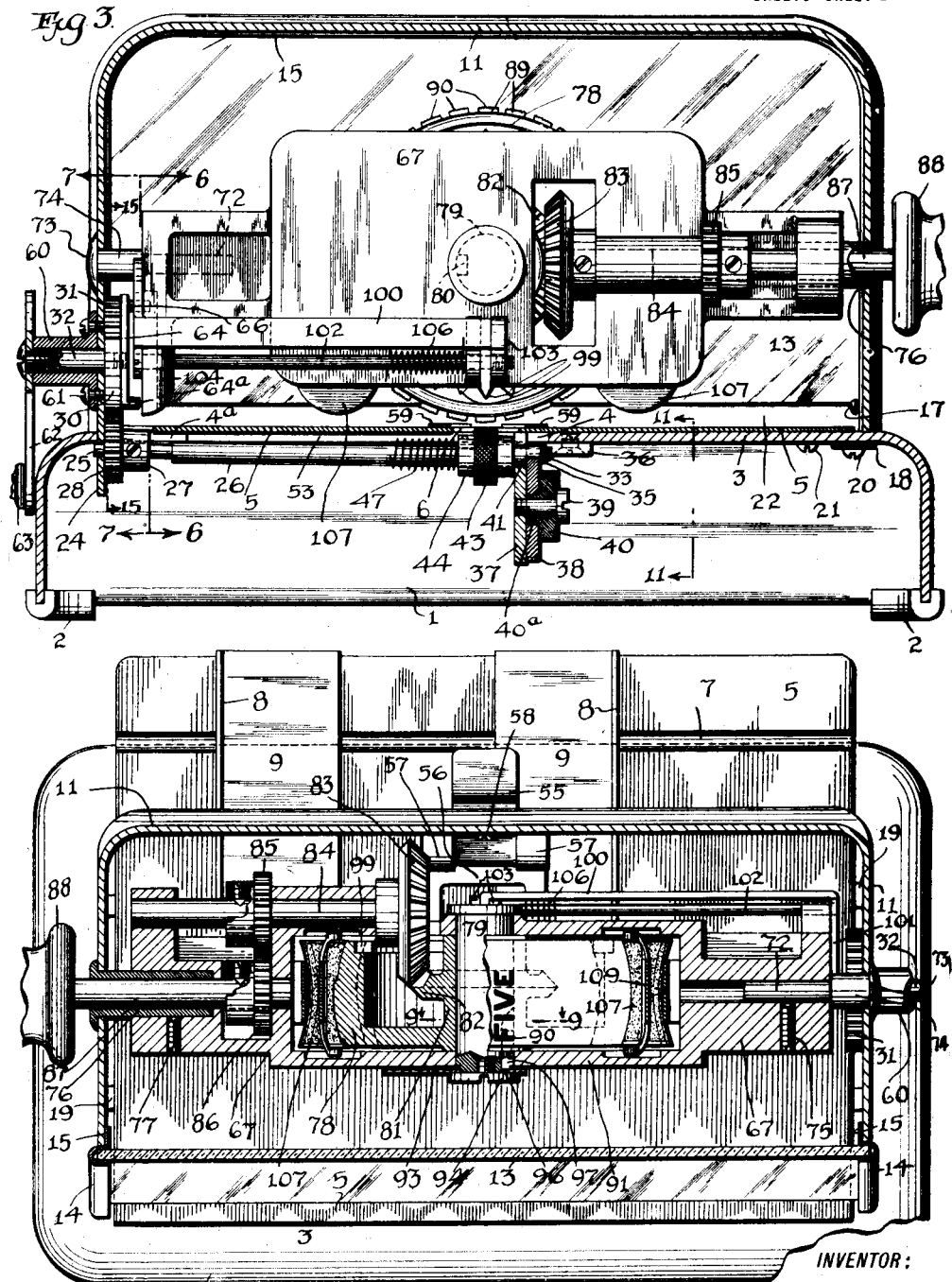

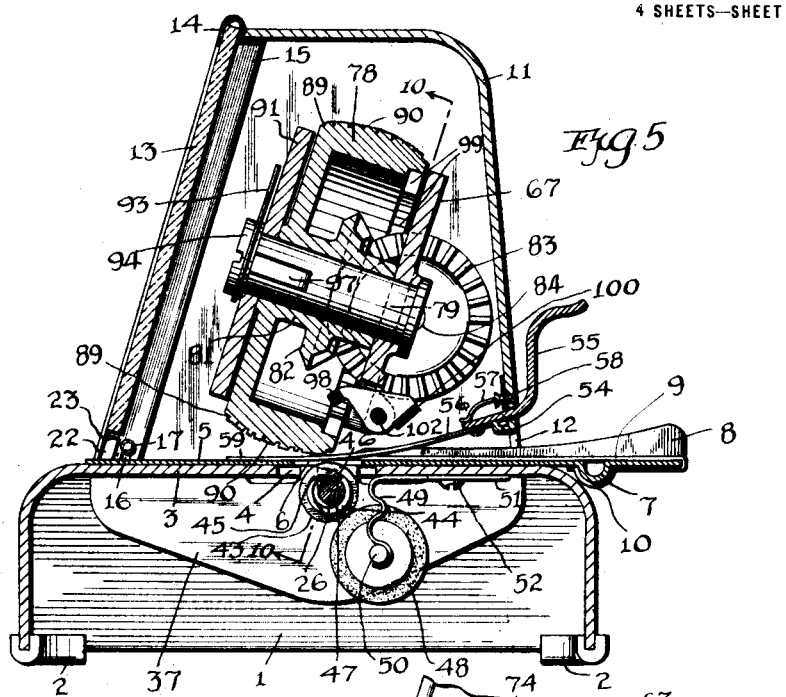

B. O. FANSLOW.
CHECK WRITER.
APPLICATION FILED DEC. 11, 1916.
1,368,912.
Patented Feb. 15, 1921.
4 SHEETS—SHEET 4.
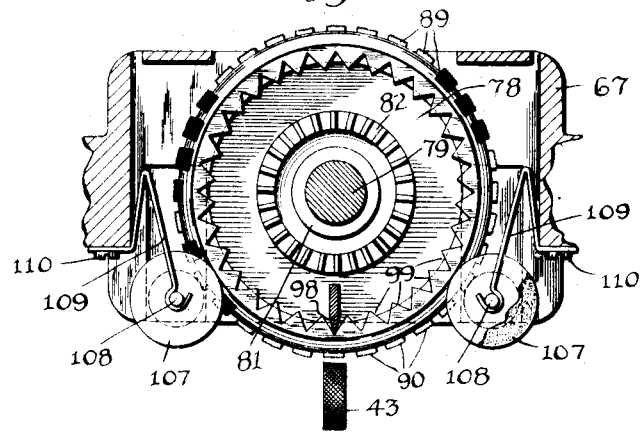
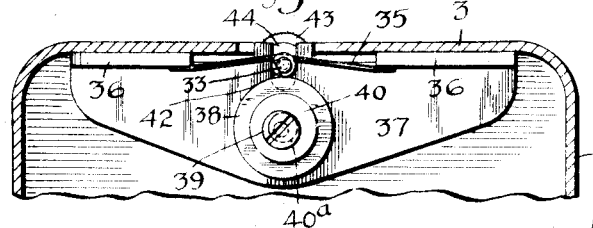
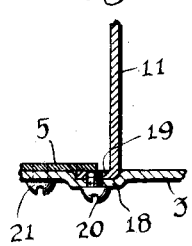
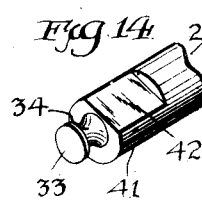
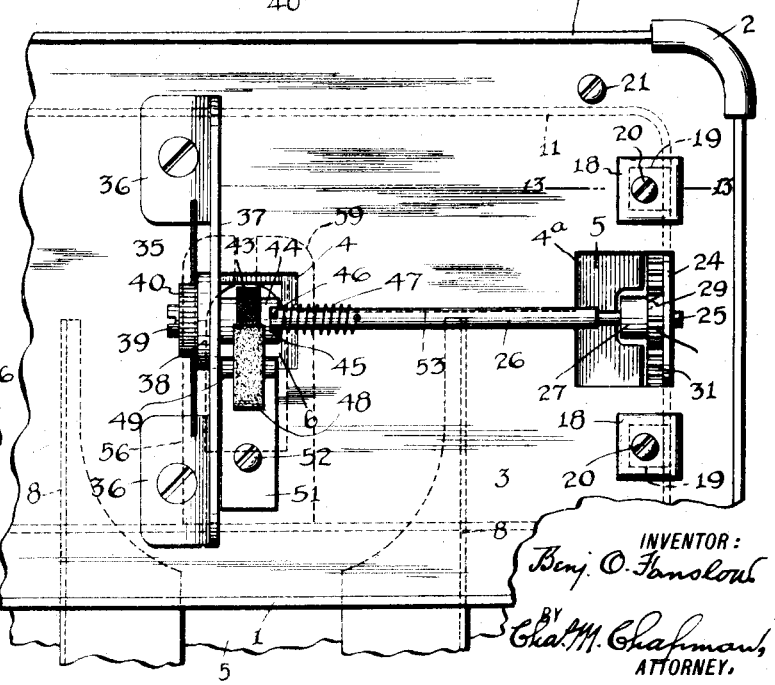
INVENTOR:
Benj. O. Fanslow
BY
Chas. M. Chapman,
ATTORNEY.

UNITED STATES PATENT OFFICE.

BENJAMIN O. FANSLOW, OF NEW YORK, N. Y., ASSIGNOR TO NEW ERA MANUFACTURING COMPANY, OF NEW YORK, N. Y., A CORPORATION OF NEW YORK.

CHECK-WRITER.

1,368,912.  Specification of Letters Patent.  Patented Feb. 15, 1921.

Application filed December 11, 1916. Serial No. 136,152.

*To all whom it may concern:*

Be it known that I, BENJAMIN O. FANSLOW, a citizen of the United States, residing in the borough of Manhattan, city, county, and State of New York, have invented a new and useful Improvement in Check-Writers, of which the following is a description.

This invention relates to check protecting machines and, particularly, to machines of the type known as check writers, the same being capable of printing in words any predetermined amount, within certain wide limits, and simultaneously breaking, disintegrating, embossing or "macerating" the fiber of the paper.

Among the objects of my invention may be noted the following: to provide a visible check writer, that is, a check writer of a type such that, when the check printing and feeding operations are in progress, the same may be clearly observed through the frontplate of the machine, the same also being true of the setting or indicating operation which takes place as a preliminary to the printing operation; to provide a check writer with a transparent frontplate through which practically all the parts, or the most important parts, of the check writer can be observed during the operations of the machine, including the setting, printing and feeding of the check; to provide a simple, compact, inexpensive and very effective check printing and macerating machine by means of which the check may be simultaneously impressed and inked and the paper macerated, embossed, or disintegrated more or less along the entire length of the word being printed and simultaneously with the latter operation; to provide a check writing machine with one manipulating means conveniently arranged whereby the printing-wheel may be "set," and with another conveniently arranged and independent means whereby the platen and printing-wheel are brought into coöperative relation for impressing, inking, macerating and feeding the check in the necessary manner; to provide a check writing machine with means whereby the platen is brought positively into engagement with the printing-wheel and the latter is positively moved by the former during the printing, macerating and feeding operations, and this regardless of the length of the word printed or the varying lengths of successive words printed; to provide a check writer with means whereby the platen is caused to positively actuate the printing-wheel and the two to positively feed the check through the machine variable distances, without the intervention of additional or independent feeding means; to provide a check writer with an inking means through the medium of which all the type-blocks of the printing-wheel are completely and uniformly spread with ink, whereby successive impressions are uniform in appearance; to provide an inking means, in addition to the foregoing, whereby the platen may be inked so as to spread the ink upon the bottom of the check and thus additionally incorporate the ink in the fiber of the check during the printing, feeding and macerating operations; to provide a means in a check writer such that, when the check is entered into the machine, its front edge or end may be observed through the face-plate of the machine to determine whether it is in the proper position as to lengthwise placing and proper alinement for printing; to provide a combined presser and stripper for check writing machines which, while imposing the necessary tension upon the check, does not impede its entry into, or progress through, the machine; to provide details of construction in a machine of the character set forth in the foregoing, whereby the operations indicated may be produced positively and with a high degree of certainty, but without the necessity for close fitting of parts in the machine; to provide details of construction in a machine such as set forth in the foregoing whereby, during the operation of setting the printing-wheel, the latter will be easy of manipulation and whereby, after the setting operation has been completed, the printing-wheel will be locked from rotation and held locked until the printing, macerating and feeding operations have been completed; to provide a check writing machine wherein the printing-wheel may be rotated in opposite directions for selecting or setting any one of the type-blocks thereof in printing position, and thereafter may be given a movement of oscillation to a limited degree for the printing, macerating and feeding operations, all of which take place simultaneously; to provide means whereby a printing-wheel, operated as just suggested, may have all its movements positively imparted and, after the printing, macerating and feeding operations have taken place, may be positively returned to a normal position in coöperative relation to the platen, whereby, when the latter is next started in action for a functional operation, it will immediately engage the printing-wheel without any further movement on the part of the latter; to provide a check writing machine with a printing couple comprising a rotary platen through the medium of which the feeding operation is accomplished and which platen, during its movement into engagement with the printing-wheel, is devoid of, or held from, rotary movement; to provide a simple, inexpensive check guiding means for positively guiding the check through the machine and the parts of which may be quickly and independently manipulated to engage and guide checks of varying widths; to provide a mechanism by means of which the desired sum of the check may be printed in words and incorporated in the fiber of the check material by inking, so as to prevent alteration of, or tampering with, the check; to provide means for regulating the extent to which the check will be macerated during the printing and feeding operations; to provide means by which any desired sum or check value may be entirely impressed, inked and incorporated into the fiber of the check, regardless of the total and regardless of the length of the words used in combination; to provide means by which, during the printing, inking and macerating operations, the check will be traversed through the machine the length of the word printed, plus the space between said word and an adjacent word; to provide a printing couple having embodied therein a means by which the check, at the time it is impressed, inked, and macerated, will be fed through the machine the desired and variable distances, regardless of the length of the word impressed, thus doing away with additional or independent feeding means; to provide a mechanism by means of which the printing-wheel and its coöperating die or platen are brought into engagement with the paper effectively as a preliminary to the printing, macerating and feeding operations; and to provide various details of construction through the medium of which the foregoing objects are accomplished and carried out in positive, direct and effective manner.

With the above objects in view and others which will be set forth during the course of this description, my invention consists in the parts, features, elements and combinations thereof hereinafter described and claimed.

In order that my invention may be clearly understood, I have provided drawings wherein:

Figure 1 is a front elevation of my new "visible" check writer;

Fig. 2 is a top plan view of the check writer of Fig. 1;

Fig. 3 is a vertical section substantially on the line 3—3 of Fig. 2;

Fig. 4 is a horizontal section substantially on the line 4—4 of Fig. 1;

Fig. 5 is a vertical section substantially on the line 5—5 of Fig. 2;

Fig. 6 is a sectional detail substantially on the line 6—6 of Fig. 3, looking in the direction of the arrows;

Fig. 7 is a sectional detail substantially on the line 7—7 of Fig. 3, looking in the direction of the arrows;

Fig. 8 is a perspective view, with parts detached, showing the manner in which the pointer is held upon the shaft of the printing-wheel;

Fig. 9 is a sectional detail substantially on the line 9—9 of Fig. 4;

Fig. 10 is a sectional view substantially on the line 10—10 of Fig. 5;

Fig. 11 is a sectional detail substantially on the line 11—11 of Fig. 3;

Fig. 12 is a bottom plan of a part of the bed of the machine, showing details of the platen mechanism and inking device therefor;

Fig. 13 is a sectional detail on the line 13—13 of Fig. 12;

Fig. 14 is a perspective view of the forward end of the platen shaft; and

Fig. 15 is a sectional detail substantially on the line 15—15 of Fig. 3.

Referring to the drawings, the numeral 1 indicates the base of the machine, to the bottom of which, at the four corners thereof, are secured grooved feet or pads 2 composed of rubber, fiber or other soft material calculated to prevent the machine from slipping over a smooth surface or scratching the table or desk-top on which the machine may be set. The top 3 of the base is provided with an aperture 4 therein, through which the roller platen hereinafter described is adapted to operate. To the top of the base 3 is secured a bed-plate 5, which extends over substantially the entire surface of the top of the base and in which is formed an opening 6 registering with the opening 4 in the top of the base. The bed-plate 5 is extended rearwardly beyond the base 1 and is formed near its outer edge with a longitudinal groove provided in a flange or rib 7 extending entirely across said bed-plate. The said flange 7 provides a means by which to secure check-guides 8 to the bed-plate, the same having bottom portions 9 extending at an angle to the guide portions 8 and forwardly within the machine to a point substantially centrally thereof between the back and front of the machine. The bottom portions of the guides 8 are extended over the edge of the bed-plate 5 and thereunder are formed with grooved members 10 corresponding in form to, and frictionally engaging, the flange 7 on the bottom of said bed-plate. The coöperating parts 7, 9 and 10 enable the guides 8 to be easily shifted over the bed-plate 5, so as to set the guides in any position desired from end-to-end of the machine, to accommodate varying widths of checks and locate the lines thereof, on which the printing or marking is to be done, in accurate registry with a type-block on the printing-wheel. Secured to the top of the base 1, and overhanging the same, is the frame or cover 11 of the machine, the same being open across its entire front and provided across its entire back at the base with a slot 12, into which the check is introduced between the guides 8. The open front of the frame 11 is closed by the glass-plate, or other transparent medium 13, set within a suitably formed frame 14 secured to the machine-frame 11 by means of the flange 15, the bottom portions of which latter are notched at 16 to engage headed pins 17 extending from the inner sides of the frame 11 at the bottom and front thereof, as shown in Figs. 3 and 5. By this means the transparent or glass face-plate 13 is held from displacement at the bottom and prevented from being raised upwardly to remove the same without first overcoming the friction between the frame 11 and the flange 15 by a movement outwardly or to the left, viewing Fig. 5. Preferably, the transparent face-plate 13 is arranged at a decided inclination to the base 1 and the frame 11, thus enabling a great deal of the interior mechanism of the machine to be observed, and exposing to view the check and the printing and feeding operations, during the operation of the machine. The frame 11 is secured to the bed 1 by any suitable means; but, preferably, as shown in the details of Figs. 12 and 13, wherein the top 3 of the base is shown as provided with a depression 18, in which is set a flange 19 extending inwardly from the frame 11 and through which portions 18 and 19 a screw 20 is passed for holding the same tightly together. The bed-plate 5 extends over the flange 19 and the end of the screw 20, thus hiding the same, and is secured in place on the top of the base by a plurality of screws 21 passing through the top of the base and into said bed-plate 5. This construction is provided at several convenient points at each end of the machine, as shown, for example, in Fig. 12. The face-plate 13 terminates a short distance above the bed-plate 5 at the front of the machine, thus providing the exit slot 22 across the entire front of the machine, through which the check emerges as it is operated upon by the printing-wheel and platen, and the said face-plate 13 is held in the position shown in Fig. 5 by a pair of small lugs or pins extending from, or through, the frame 14, at opposite sides, as shown in Fig. 5 and indicated at 23. The top 3 of the base, at one end thereof, see Figs. 3, 7 and 12, is provided with a depending flange or bearing-plate 24 in which is loosely journaled to rotate and swing vertically the reduced end 25 of the platen-shaft 26, and to which end, by means of its hub and screw 27, a mutilated pinion 28 is secured, the mutilated portion being indicated at 29 and curved so as to conform to the mutilated portion 30 of a gear 31, fixed to the crank-shaft 32, journaled in one end of the frame 11, just above the top of the base 1. The platen-shaft 26 at its opposite or executive end is provided with a reduced extension 33, provided with a circumferential groove 34, in which operates and is retained the central portion of a strong spring 35, the ends of which are engaged, without fastening, with the bottom of two horizontally extended ears 36 of a bracket 37, secured by said ears to the top 3 of the base 1. A rolling disk 38 is secured to the bracket 37, by a screw 39 passing through a knurled nut 40, having an eccentric journal 40ª on which said disk 38 turns and by which its field of operation can be regulated; that is to say, it is important to regulate the coöperative pressure of the printing-wheel and platen upon the check and this is accomplished, in one form of my invention shown, by adjusting the position of the disk 38 by the eccentric and adjustable bearing 40ª. The disk 38 turns freely on the bearing 40ª and coöperates with both the smooth or concentric portion 41 and flat or eccentric portion 42 of the platen-shaft this coöperation between the shaft and rolling disk 38 being to force the platen-shaft upwardly relatively to the top of the base 1 against the tendency of the spring 35 to hold and force the same downwardly, and to permit said shaft to drop when the flat or eccentric portion 42 thereof engages the said rolling disk 38. The degree of maceration, or the crushing or bruising effect of the platen and printing-wheel upon the check, will thus be regulated according to the position of the bearing 40ª, which controls the field of operation of the roller 38. The platen roller or wheel 43 is carried by a collar or sleeve 44 mounted freely upon the platen-shaft 26 and provided at one end with the elongated notch or opening 45 in which operates a pin 46, carried by the platen-shaft 26, and which pin causes the rotation of the platen at the proper time after the engagement of the latter with the type-block on the printing-wheel. A spring 47, coiled about the platen-shaft 26, and secured thereto at one end and to the sleeve or collar 44 at the other end, tends normally to hold one end of the slot 45 in the collar 44 against the pin 46, so as to permit the shaft 26 to have rotary movement relatively to the platen during the elevation of the shaft 26, without rotating the platen. The object of this will be explained presently. To prevent the spring 47 from causing the collar 44, with its platen 43, to normally follow the shaft 26 during its initial rotary motion, an anti-frictional roller 48 is caused to bear upon the platen, see Figs. 5 and 12, by pressure of the spring arms 49, in which the said roller 48 is journaled, as at 50, the spring arms being part of a plate 51 secured by screw 52 to the top 3 of the base. The roll 48 thus acts as a retarding means for the platen and overcomes the normal tendency of the spring 47 to cause the latter initially to follow the shaft 26, when the latter is started into operation, and operates to hold the platen from rotation until the pin 46 engages the opposite end of the slot 45, whereupon the platen is driven with the shaft 26, through the medium of the said pin 46 and notwithstanding the friction imposed upon the platen by the roller 48. The roller 48 has been found sufficient to hold the platen against rotary movement on the rise thereof into contact with the printing-wheel and can be used alone; but, I prefer to add the spring 47, since it insures the proper operation of the platen. The roller 48 is also utilized as an inking device and spreads its ink uniformly over the periphery of the platen, so that the latter, when performing its functions of driving the printing-wheel and feeding the check, will also ink the bottom of the latter along the printing line. The spring arms 49, which support the roller 48, cause the latter to follow the platen during its upward movement and yield to the platen during its downward movement, and coöperate with the platen with a rolling contact; and the construction is such, together with the coöperative relation of the roller 48 and platen 43, that the roller is retained by its journals 50 in engagement with the spring arms 49 by the platen. Thus it will be seen that the roller 48 can be readily removed for replenishing the ink or for renewal, when desired.

The periphery or surface of the platen is preferably provided with minute projections or points, which may be diamond-shaped, pyramidal, conical, or of any other form desired. Preferably, I provide the periphery of the roller platen with innumerable fine points by cutting, scoring, or otherwise marking the surface of the roller in criss-cross fashion, and the points may be of any depth desired or required for the effects contemplated upon the check.

The platen is located directly under, or partially within, the opening 4 in the top of the base and normally is at rest below the surface of the bed-plate 5; and, in order to provide for free play of the platen-shaft 26, without engagement with the top 3 of the base, the latter is preferably slotted longitudinally from the opening 4 to the opening 4ª, as indicated at 53, thus avoiding also interference with the functions of the spring 47. Hence, the platen may be raised and lowered, so as to be projected through the bed-plate into coöperation with a type-block on the printing-wheel and dropped below the surface of the bed-plate, so as not to interfere with, or normally engage, the bottom of the check, permitting the check, therefore, to be inserted in the machine and withdrawn therefrom at will without smearing the bottom of the latter by contact with the inked surface of the platen.

In order to frictionally hold the check upon the bed-plate, I have provided a combined presser and stripper, shown in its details in Fig. 5. The frame 11 just above the slot 12, at the back of the machine, is provided with an inturned and upturned flange 54 and above the same with a slot through which the handle 55 projects from the outside of the machine to the inside thereof, and the inner portion of which handle has rigidly secured thereto a duplex, resilient combined presser and stripper. The handle 55 is journaled by a lug or downturned member in the upturned flange 54, so as to pivot therein and enable the handle to lift the stripper 56 from the check or bed-plate of the machine. A spring 57 is rigidly secured to the frame 11, as by one or more screws 58, the said spring bearing upon the horizontal portion of the handle 55, to which the presser 56 is attached. The presser is bifurcated so as to provide two long, slender, resilient fingers 59, Figs. 3 and 5, which operate on opposite sides of the platen, in front thereof, and normally press upon the bed-plate 5 or upon the check, when the same is placed in the machine. The fingers 59 are made resilient so as to impose a normal, light tension upon the check, in advance of the platen and on opposite sides of the line of printing, and thus operate to prevent the check from being accidentally shifted relatively to the line of feed and printing, and also to prevent overthrow of the feeding and printing couple, should the latter be operated at high speed. The tension imposed by the combined presser and stripper is not enough to prevent the easy insertion and removal of the check by the operator, but is sufficient to prevent the check from following, should there be any tendency so to do, the platen in its downward movement or stick to the face of the type-blocks after the printing and feeding operation has been effected.

The tension of the fingers 59 upon the check or bed-plate can be relieved by manipulating the handle 55 against the tendency of the spring 57 to depress the said fingers 59. Any suitable form may be given to the fingers at their outer ends, and the latter should be made sufficiently extensive to provide a large area for pressure upon the check.

As before noted, the mutilated gear 31 is connected to the crank-shaft 32, journaled in the frame 11, just above the top of the base, the journal being afforded by the bearing 60 secured by a collar and screws 61 to the side of the frame 11, see Figs. 2 and 3. The shaft 32 has secured thereto, at its outer end, the crank-arm 62 having manipulating handle 63, and said crank-arm may be extended on opposite sides of the shaft, if desired, to provide for rotation of the shaft through the medium of several fingers of one hand. The inner end of the shaft 32, adjacent the mutilated gear 31, is provided with a plate 64 secured thereto against relative rotary movement by the screw 65 passing through concentric slot 65ª, said plate having extending therefrom, near one end, a crank-pin 66, see Figs. 3, 6 and 7, which crank-pin is adapted to operate in the switch-cam groove at the adjacent end of the carrier 67, journaled at its opposite ends in the frame 11, and having oscillatory movement therein relatively to the bed-plate of the machine. The switch-cam may be formed in the end of the carrier 67, or in any other convenient manner, and consists of the central oblate switch member 68 around a portion of which is extended the concentric groove 69 merging at its top into the recess-groove 70, into which also merges the functionless area 71 of the switch-cam groove. The bottom of said groove is entirely open at the base of the carrier 67, thus enabling the crank-pin 66 to enter and leave the groove to a small extent during the rotation of the crank-plate 64. When the crank-pin 66 is in the area 71 of the switch-cam groove, it performs no function upon the carrier 67; but, upon entering the recess 70 of the groove, it starts to operate positively upon the carrier to return the latter to its normal position in coöperative relation to the platen, which position marks the beginning of a printing, feeding and macerating operation of the printing couple. The driving contact of the crank-pin with the carrier 67 is continued until said crank-pin leaves the groove 69 of the switch-cam, during which contact the carrier is positively driven by said crank-pin. By this and further description, it will be understood that springs are not employed to impart any of the movements of the printing-wheel. The slot 65ª is for the purpose of enabling the crank-pin 66 to be adjusted on its axis so as to regulate the amount of return movement of the printing-wheel, or the position to which the same shall be moved rearwardly so as to coöperate with the platen.

As shown in Figs. 1, 3, 4 and 5, the carrier 67 is a hollow body and may be a casting if desired, and at the crank end of the machine is journaled upon a pin 72 supported in the frame 11 of the machine and adapted to turn therein, the outer end of said pin being headed, as at 73, to prevent the same from having longitudinal movement in the frame, an enlarged portion 74 of the pin engaging the end of the carrier 67 to prevent the latter from having movement toward the frame. The pin 72 is secured to the carrier by means of the binding-screw 75. At its opposite end, the carrier is journaled upon a sleeve 76 mounted in the frame 11 and headed on the outside of the latter, said sleeve entering the carrier 67 and being fastened thereto by the binding-screw 77. Viewing Fig. 1, it will be seen that the journals of the carrier 67 are above the crank-shaft 32. The carrier 67, in its hollow central portion, see Fig. 4, carries a printing-wheel 78, which is in the form of a section of a sphere, the section being produced by cutting through the sphere in two parallel planes equidistantly disposed on opposite sides of any plane intersecting the axis of the sphere. This produces a wheel having two flat, parallel faces joined by a convexed or arc-shaped circumference. The printing-wheel is journaled to rotate in the carrier 67 with a pin 79, the connection between the pin and wheel being by means of the feather or rib 80, Fig. 9, entering a groove in the pin 79, the feather 80 being formed on a central, axial, hub portion 81 of said wheel, see also Fig. 5, which hub portion carries a bevel-gear 82, which extends within the body of the wheel. The back of the wheel is open, while the front thereof is solid, and through the back thereof the bevel-gear 83 enters into engagement with the bevel-gear 82 so as to rotate the printing-wheel. The bevel-gear 83 is carried at one end of a shaft 84 journaled in the carrier 67, and near its opposite end said shaft carries the pinion 85 meshing with the pinion 86, carried at one end of a shaft 87, extending through the journal 76 and having at its outer end the knob 88 screwed thereon for ready removal, when desired. Through the train of gearing just described, it will be seen that the printing-wheel 78 may be twirled or rotated by turning the knob 88, and that the rotation may be in opposite directions. The printing-wheel has formed on its circumference printing-blocks which are integral and may be cut thereon or thereinto, the same being indicated generally by 89, in or on the surface of each of which the types or lines of types 90 are cut or formed. The surface of the types or lines of types is formed into minute points in the same manner and correspondingly with the circumference of the platen 43. The type-blocks or lines of type are spaced apart in parallel relation and extend transversely of the wheel and around its circumference, and the printing-surface of the type-blocks is curved longitudinally in conformity with the arc-curvature of the circumference of the printing-wheel and in the general direction of the length of the axis thereof and laterally slightly in conformity with the circumference of the printing-wheel around its axis. The flat face of the printing-wheel is covered by a dial-plate 91 which may be an integral part of the face of the carrier 67, the said plate being provided with a circular series of radial notches, depressions or marks 92 adjacent each of which is a number or character, the numbers running from 1 to 20 consecutively, and then by tens from 30 to 90, and the characters representing hundreds, thousands, dollars, cents and a terminal sign or mark. Coöperating with the dial thus made and disposed centrally thereof, and operating within the circle of characters thereof, is a pointer 93 held to the shaft 79 by means of a clamping screw 94, the head of which binds the pointer to the said shaft for free movement above the dial-plate 91 around, and relatively to, the radial marks and corresponding characters. The pointer 93 is held to the shaft 79, as shown in Fig. 8, so as to rotate therewith, by encircling a boss or extension 95 on the shaft and having a lug or feather 96 which enters a groove or slot 97, extending longitudinally of the said shaft 79. The position of the pointer on the shaft is fixed, and the position of the printing-wheel on the shaft is likewise fixed, by the means which have been described, and the arrangement of the printing-blocks or lines of type on the circumference of the printing-wheel relatively to the pointer is such that, when the pointer is brought into register with a given character on the dial, the printing-block, or line of type corresponding to said character, will be set or disposed in coöperative relation to the platen, substantially as shown in Figs. 3, 6 and 10.

After the printing-wheel has been set, which operation is performed by the knob 88 with the printing-wheel in its forward-extreme and inclined position shown in Fig. 5, the printing-wheel is returned to its normal printing position and coöperative relation to the platen, as shown in Fig. 6. At this time, the printing-wheel is locked against rotation so that, regardless of how the knob 88 may be manipulated, the wheel cannot be turned. This result is effected by the means shown in Figs. 3, 4, 5, 7, 10 and 15, wherein the detent 98 coöperates with any one of a circular series of notches 99, provided in any suitable way in the inner surface of the printing-wheel 78, the said detent being carried by a bar 100 extending longitudinally, and along the back, of the carrier 67 to the end thereof adjacent the crank end of the machine, at which point the bar has an elongated member 101, which projects over the end of the carrier into the range of movement of the actuator $64^a$ in the form of a curved flange extending laterally from the plate 64, carried by the mutilated gear 31, said actuator being at the opposite end of the plate from the crank-pin 66 and its curved surface operating upon the plane-surface of said member. The bar 100 is journaled upon the long pin 102, one end of which is screwed into the lug or ear 103, and the opposite end of which passes through a portion 104 of the carrier 67 and also through the lower end of the member 101, said pin at this end being provided with a slot 105 for manipulation by a screw-driver or blunt instrument. A spring 106 surrounds the pin 102 and has one end bearing upon the carrier 67, and the other upon the bar 100, the tendency of the spring being normally to throw the detent 98 into one of the notches 99 of the printing-wheel to hold the same from rotation. The detent is removed from the notches 99 by wiping of the actuator $64^a$ upon the plane-surface of the member 101, moving the latter around its axis 102 in a right-hand direction, viewing Fig. 15, thus lifting the detent at the opposite end of the bar 100. This, as before noted, occurs when the printing-wheel is in the position of Fig. 5, while the locking action of the detent mechanism occurs when the printing-wheel is being shifted to the position of Fig. 6 preparatory to a printing operation. In order to make the locking action of the detent 98 positive and insure the accurate setting of a type-block, or line of type, in printing position, the pin $101^a$ is fixed to the frame so as to project into the path of movement of the member 101, engage the latter, and force the same in the direction it is moved by the spring 106, or in the left-hand direction, Fig. 6, thus compelling the detent 98 to move clear to the bottom of a notch, should it, for any reason, stick on, or cling to, a side wall of a notch. This result is effected during the backward movement of the carrier 67, the pin $101^a$ riding over the rounded back of the member 101, and overcoming all friction between the detent 98 and the walls of the notches 99.

The printing-blocks, or types, or lines of types on the printing-wheel, are thoroughly inked by concaved inking rollers 107 arranged at opposite ends of the carrier or opposite sides of the printing-wheel and below the axis thereof on which the printing-wheel rotates, see Figs. 3, 4 and 10. The journals of the inking rollers are supported in the loops 108 at the ends of the V-shaped spring carriers 109, which are secured to an adjacent portion of the carrier 67, by means of screws 110. The arrangement is such that the inking rollers bear yieldingly upon the printing-blocks, and so that, when a printing-block or line of type is set in coöperative relation to the platen, as shown in Fig. 10, the rollers will bear upon the surface or crowns of other printing-blocks, thus always being in inking engagement with one or the other of the printing-blocks. By making the inking rollers conform longitudinally to the curvature of the printing-blocks, the entire length of type surface thereof is uniformly inked during the rotary movement of the printing-wheel, thus making a uniform printing impression upon the surface of the check.

Viewing Figs. 5, 6, 7 and 15 it will be seen that the axis 72—74 of the carrier 67 of the printing-wheel, the axis 26 of the platen, and the axis 32 of the crank-arm 62 are all in the same vertical plane, and that this plane intersects the axis 79 of the printing-wheel transversely of its length. Hence, the several executive members related to the said axes are maintained in proper coöperative position, and the beginning of a printing operation is in the said vertical plane. This will be understood upon reference to Fig. 6 particularly, wherein it will be seen that the forward end of the printing-block or line of type, immediately coöperative with the platen, is in the same vertical plane as the several axes referred to, this being the normal position of any line of printing type when brought into normal coöperative relation or position to the platen at the beginning of a printing operation; and, it will be understood, upon reference to Fig. 6, as well as to Figs. 1, 4 and 5, that the front end of each printing-block or line of type terminates in the same plane which cuts the printing-wheel parallel with its axis on which it oscillates. Hence, the printing, feeding and macerating operation of each printing-block, or line of type, in coöperation with the platen, begins always at the same point with reference to the circumference of the printing-wheel and the front face thereof, while the termination of a printing, macerating and feeding operation is variable, according to the length of the printing-block or the line of type on the periphery of the wheel. This results in a variable feed of the check through the machine correspondingly with the length of the printing-block or the line of type; and, by the same means, coupled with the yielding action of the platen relatively to the printing-wheel, the check is fed through the machine by the successive printing-blocks or lines of type, so as to space the printed words equally, nothwithstanding the variable distances the check is fed correspondingly with the lines of type in their coöperative action with the platen. From this it will be understood that there are no feeding means independent of the lines of type and the platen, and that there are no means provided on the surface of the platen and the surface of the lines of type or printing-blocks other than their coöperating, interacting, macerating and printing surfaces, for giving the added spacing feed to the check.

From the foregoing detail description, the following mode of operation will be readily understood. The machine faces the operator as in Fig. 1, thus placing the operating crank-arm 62 at the right and the manipulating knob 88 at the left. The guides 8 are slid along the bed-plate 5, or adjusted to lightly engage the opposite edges of the check, and the guides and check are disposed so as to enable the printing to be performed upon the predetermined line on the check provided for the purpose. The check is slid into the machine through the slot 12 and under the resilient presser 56 without contact with the platen or the printing-wheel, since the platen is depressed below the surface of the bed-plate 5 by the spring 35. The check is pushed as far forward in the machine as desired, so as to start the printing at the proper point, after which the printing-wheel, assuming it to be in the position of Fig. 5, is twirled by the knob 88, through the mechanism including shaft 87, gear 86, gear 85, shaft 84, bevel-gear 83 and bevel-gear 82, until the pointer rests over the character on the dial which it is desired to impress upon the surface of the check. The particular type-block carrying the line of type indicated on the dial will then be directly over the platen, as shown in Figs. 1, 5 and 10. The detent 98, Fig. 5, is held above the notches 99 in the back of the printing-wheel by engagement of the wiper flange 64$^a$ carried by the crank-plate 64, engaging the member 101 of the bar 100, see Fig. 15. The twirling of the printing-wheel has caused its type surfaces to be inked by the inking rollers 107. The manipulation of the check, its location in the machine, and the operation of the pointer and of the printing-wheel are clearly observed through the transparent face-plate 13 of the machine, which is a very important feature of my invention. Fig. 15 shows the parts thereof corresponding substantially with the position of parts in Fig. 5. The crank-arm 62 is then turned, which in turn operates the mutilated gear 31, thus shifting the wiper flange 64$^a$ from contact with the member 101, thus allowing the detent 98 to drop, under the impulse of spring 106, into one of the notches in the back of the printing-wheel, thus preventing the same from having any rotary motion on its axis 79. This operation has also shifted the crank-pin 66 through the functionless area of the switch-cam groove to the position of Fig. 15, and, at the same time, the smooth concentric portion 30 of the mutilated gear 31 has gone into coöperation with the corresponding smooth portion 29 of the pinion 28, carried on the reduced end 25 of the platen-shaft 26. Continued rotation of the crank carries the crank-pin 66, Fig. 15, first into the recess-groove 70 in the end of the carrier 67, and then along the concentric groove 69 of the switch-cam, thus shifting the carrier with the printing-wheel rearwardly into the position of Fig. 6, and this brings the extreme forward end of the type-block, which is to be employed, directly in the vertical plane of the axes 26, 32 and 72. As the printing-wheel moves into the position of Fig. 6, the curved back of the member 101 engages the pin 101ª, and if the detent 98 has not been forced, by the spring 106, into a notch 99, said pin will drive the detent positively into said notch. The smooth surfaces 29 and 30 of the pinion 28 and mutilated gear 31 remain in contact a short period of time after the printing-wheel has thus been positioned, it being an important feature of my invention that the printing-wheel, with the type-block which is to be used in position, shall be returned to its extreme rear of movement prior to any upward movement of the platen to coöperate therewith, and it being understood in this connection that this is the initial, normal, operative relationship of the platen and the particular type-block which is to coöperate therewith for printing, macerating and feeding the check. Continued movement of the crank, in clockwise direction, will cause the teeth of the gear 31 to engage the teeth of the pinion 28 and turn the platen-shaft 26. It has been explained that the platen 43 is loose on the platen-shaft 26 and that the latter has, initially, rotary movement independently of the platen, the spring 47, Fig. 12, enabling this action of the elements. The spring 47 normally tends to move the platen, in the direction of feed, to the position of Fig. 5, so that, as the platen rises and the shaft 26 is turning, the platen will have no rotary movement. The roller 48 and friction on check and type-block help restrain the platen until the pin 46 reaches the position of Fig. 6, when the shaft drives the platen and printing-wheel positively to print and feed the check. It has been explained that the roller disk 38 coöperates with a concentric portion 41 and flat portion 42 of the platen-shaft, Figs. 11 and 14. Hence, as the platen-shaft is rotated, the flat 42 thereof passes from the roller disk 38, and the concentric portion 41 of the shaft engages with the latter, thus lifting the platen-shaft vertically, carrying the platen therewith directly into engagement with the type-block resting thereover, as in Fig. 6. During this substantially right-line movement (though it is a long arc movement, since the shaft 26 swings from its bearing in the plate 24) the platen is given no rotary movement. As it is thus lifted, the platen carries the check into engagement with the forward end of the type-block, which is in functional position, and, owing to the fact that the platen may yield slightly, due to the manner in which the platen-shaft is mounted, and owing also to the fact that the printing-wheel and other parts are mounted in a frame which is far from being rigid with the base, in the strict sense, the check is not injuriously clamped between the platen and type-block, but is effectively held for the purposes of the machine. Continued rotation of the crank 62 will cause the pin 46, on the platen-shaft, to rotate the platen 43 and thus cause said platen to positively move the printing-wheel by coöperation with the type-block, which is in functional position. Thus, the check is macerated, (or embossed) printed, (including inking) and fed through the machine a distance corresponding to the length of the type-block, plus a distance necessary for spacing the word or character printed from the next one to be printed. The spacing is accomplished by reason of the "cling" between the platen and the type-block at its extreme rear end end owing also to the yielding of the parts of the machine, as before noted. Thus, it will be understood that, simultaneously, the three functions of printing, macerating and feeding the check are accomplished by the platen and type-block while they are in coöperation, and without the aid of any additional or independent means in the machine or part added to either of the said two elements. It will also be understood that the length of a type-block is the controller for the length of the feed, which is necessarily variable, because of the varying lengths of the type-blocks. Under the term "macerating", which is a commercial and well understood term in the art, is included any surface or fiber breaking effect produced upon the check by the characteristics of the coöperating surfaces of the platen and type-blocks; that is to say, embossing, breaking up the fiber of the paper, bruising the paper, and all similar effects are included (excepting, literally, cutting the surface or fiber of the check), to enable the ink to penetrate the fiber and be absorbed thereby to prevent alteration without detection. As the functional type-block passes beyond the reach of the platen, the printing wheel becomes stationary and is held in an inclined position, such as shown in Fig. 5, while the platen continues to rotate still in elevated position, this being due to the continued operation of the concentric portion 41 of the platen-shaft 26 upon the roller disk 38. As the flat 42 of the platen-shaft reaches the roller disk 38, the spring 35 forces the platen downwardly, and the spring 47 surrounding the platen-shaft turns the platen forwardly until the pin 46 engages the opposite end of the slot 45, this position being indicated in Fig. 5. The combined presser and stripper prevents the check from overfeeding, should the operator drive the machine rapidly, and it also prevents the check from adhering to the surface of the type-block as the latter leaves the platen. The printing-wheel is now again in twirling or setting position, which is that of Fig. 5, and since the crank-pin 66 has passed, during the forward movement of the printing-wheel 78, across the functionless area of the switch-cam groove, or from the position shown in Fig. 6, to approximately that shown in Fig. 15, the detent 98 has been elevated from the notches at the back of the printing-wheel, as previously explained, thus permitting the free movement of the printing-wheel on its axis through the medium of the knob 88 and train of gearing. Any other type-block can now be set in functional position and the operations proceeded with as before explained. It is noted that, from the time the type-block, which is in functional position, passes from engagement with the platen, having performed its functions, the printing-wheel is capable of being twirled until after the return movement of the printing-wheel is begun. The adjustment of the plate 64, permitted by the slot 65ª, enables the wiper 64ª to delay the entrance of the detent 98 into a notch 99 more or less relatively to the movement of the carrier 67. And the position of the crank-handle 63, during this period, is practically at its lowermost position, this position of the crank-arm and handle indicating to the operator the time at which the printing-wheel may be twirled for setting. If the roller 48 be utilized as an inking device, it will spread ink uniformly upon the periphery of the platen, thus enabling it to ink the bottom of the check along the line of printing intermittently and during the entire time of coöperation of the type-block. Thus, the check is very thoroughly inked along the printed line on both sides of the paper.

It is important to note that all the functional movements of the machine are positive and are not dependent upon springs which are liable to lag and not perform their functions properly; that is to say, the platen is driven positively vertically into contact with the printing-wheel, and is also driven positively to feed, ink and macerate the check, while the printing-wheel is twirled positively in both directions and is oscillated positively. Hence, the printing, macerating and feeding movement of the printing-wheel is positively imparted by the platen, while the return movement of the printing-wheel to its initial, coöperative position relatively to the platen is imparted by the positive drive of the crank-pin 66, through the medium of the crank-shaft 32 and crank-arm 62. The mechanisms by which these results are accomplished are important features of my invention and stress is laid thereon for purposes of claim. Another important feature of my invention is the combined presser and stripper by means of which the check is held yieldingly upon the bed-plate of the machine and prevented from being overfed and from following the printing-wheel, after the latter has passed from coöperative engagement with the platen. This structure is also important because of the fact that the check can be pushed forward in the machine and retracted at the will of the operator, without manipulating the handle 55, so as to set the end of the check relatively to the printing-wheel, or the forward end of the type-block thereon, to enable the line of printing to be impressed without covering printed matter frequently applied to the check in the form of the name and address of the person issuing the check. The pressure of the members 59 of the presser and stripper can be relieved at will, however, by manipulating the handle 55.

Having thus described my invention, what I claim and desire to secure by Letters Patent is:

1. A check writer having a printing-wheel, means for supporting said printing-wheel whereby the same may be oscillated for printing, said printing-wheel having a plurality of parallel lines of type thereon, means for rotating said printing-wheel to bring said desired line of type into position for printing, a platen mounted to rotate, means for giving a relative movement to the printing-wheel and platen for causing the check to be gripped between the printing-wheel and platen, and means for rotating the platen while in gripping contact with the check for oscillating the printing-wheel for printing purposes.

2. A check writer having a printing-wheel, means for supporting said printing-wheel whereby the same may be oscillated for printing, said printing-wheel having a plurality of parallel lines of type thereon, means for rotating said printing-wheel to bring said desired line of type into position for printing, a platen mounted to rotate, means for giving a relative movement to the printing-wheel and platen for causing the check to be gripped between the printing-wheel and platen, means for rotating the platen while in gripping contact with the check for oscillating the printing-wheel for printing purposes, and means movable with the printing-wheel in its oscillation for applying ink to the printing-wheel.

3. A check writer having a printing-wheel, means for supporting said printing-wheel, whereby the same may be oscillated for printing, said printing-wheel having a plurality of parallel lines of type thereon, means for rotating said printing-wheel to bring said desired line of type into position for printing, a platen mounted to rotate, means for moving said platen into contact with the printing-wheel and for rotating said platen while in contact with the printing-wheel, whereby said printing-wheel is oscillated for printing purposes.

4. A check writer having a printing-wheel journaled to oscillate and mounted to rotate, and also having a platen mounted to rotate; means whereby the printing-wheel is given a movement of oscillation through the medium of the platen during the rotary movement of the latter; and means for positively imparting the reverse movement of oscillation to the printing-wheel.

5. A check writer having a rotary and oscillatory printing-wheel and a rotary platen normally out of contact with the printing-wheel; means whereby the platen may be moved directly into contact with the printing-wheel; and means by which the platen may be caused to drive the printing-wheel to print, feed and macerate the check.

6. Guiding means for a check protecting machine comprising, in combination with the frame thereof, a bed-plate having a longitudinally extending rib or raised member; a plurality of check guides at rest on said bed-plate and movable relatively and having means frictionally engaging the said rib on the said bed-plate, whereby the check guides are frictionally held in position upon the bed-plate.

7. A check writer having, in combination, a rotary and oscillatory printing-wheel; a rotary and reciprocatory platen; means for rotating the printing-wheel; and means for reciprocating and rotating the platen, whereby the platen may be moved into and out of engagement with the printing-wheel and, while in engagement with the printing-wheel, may drive the latter to print, macerate and feed the check.

8. A check writer having in combination, a rotary and oscillatory printing-wheel having a plurality of parallel lines of type, a rotary and reciprocatory platen, means for rotating the printing-wheel to bring the desired line of type thereon in printing position, and means for reciprocating and rotating the platen, whereby the platen may be moved into and out of engagement with the printing-wheel and while in engagement with the printing-wheel may move the latter to print and feed the check, said platen and said lines of type having coöperating roughened surfaces for macerating said check and facilitating the feeding thereof.

9. In combination with the frame of a check writer, a bed-plate mounted thereon having a rib on its bottom; a plurality of guiding devices at rest on the surface of said bed-plate and movable relatively thereto; and means carried by said devices extending over the edge of the bed-plate and engaging the rib thereof, whereby to maintain the said devices upon the bed-plate and enable them to be frictionally held in adjusted position on the latter.

10. A check writer having a printing-wheel and a coöperating platen normally out of engagement with the printing wheel, the printing-wheel being provided with a plurality of lines of characters; means for inking the characters; means for moving the platen into engagement with the printing-wheel; and means whereby the platen is caused to positively drive the printing-wheel for printing and feeding a check.

11. A check writer including in combination, a base and an inclosing frame, a printing wheel journaled in the frame so as to rotate and swing, the swinging movement being at an angle to the axis of rotation, a platen in the base, means for rotating said platen and for bringing the platen and printing wheel into engagement for driving the printing wheel from the platen so as to print and feed the check.

12. A check writer including in combination, a base, and an inclosing frame, a printing wheel journaled in the frame so as to rotate and swing, the swinging movement being at an angle to the axis of rotation, a platen in the base, means for rotating said platen and for bringing the platen and printing wheel into engagement for driving the printing wheel from the platen so as to print and feed the check, and means outside of the inclosing frame and connected with the printing wheel for rotating the same.

13. A check writer including in combination, an inclosing frame, a printing wheel having a plurality of parallel lines of type journaled within said inclosing frame, means outside of said frame and connected with the printing wheel for rotating the printing wheel to bring the desired line of type into printing position, a bed plate carrying said inclosing frame, a platen journaled below the bed plate, means at the opposite side of the inclosed frame from the means for rotating the printing wheel for rotating the platen and for moving said platen into coöperative relation with the printing wheel.

14. A check writer comprising a frame composed of an upper and a lower portion divided by a bed-plate; a printing-wheel journaled in the upper portion so as to rotate and to oscillate; a platen journaled in the lower portion so as to rotate and reciprocate; means at one side of the machine for rotating the printing-wheel; and means at the other side of the machine for rotating and reciprocating the platen and for oscillating the printing-wheel.

15. A check writer including in combination, an inclosing frame, a carrier journaled in said frame to swing, a printing wheel journaled on said swinging carrier to rotate, a dial mounted on said carrier, a pointer connected to the printing wheel and associated with said dial, a transparent face plate in said inclosing frame through which the dial and pointer and printing wheel are visible, means outside of said frame and devices operated thereby for rotating said printing wheel, and a platen associated with said printing wheel.

16. A check writer including in combination, an inclosing frame, a carrier journaled in said frame to swing, a printing wheel journaled on said swinging carrier to rotate, a dial mounted on said carrier, a pointer connected to the printing wheel and associated with said dial, a transparent face plate in said inclosing frame through which the dial and pointer and printing wheel are visible, means outside of said frame and devices operated thereby for rotating said printing wheel, a platen associated with said printing wheel, means outside of said inclosing frame and connected to said platen for moving said platen into engagement with the printing wheel and for rotating the platen to cause the printing wheel to swing for printing and feeding the check.

17. A check writer having a printing couple composed of a rotary printing-wheel and a rotary platen; means for supporting the printing-wheel having an oscillatory movement, said printing-wheel being journaled in said supporting means; means for rotating the printing-wheel relatively to the supporting means; means for moving the platen into engagement with the printing-wheel; and means for rotating the platen, while in engagement with the printing-wheel, to positively drive the latter.

18. A check writer comprising a printing couple including a rotary printing wheel, and a rotary platen, means for supporting said printing wheel whereby the same may be oscillated for printing, means for rotating said platen and for moving said platen into engagement with the printing wheel for causing said printing wheel to oscillate to print and feed a check, and means carried by the supporting means for the printing wheel and coöperating with the printing wheel for holding the latter from rotation during the printing and feeding movement of the check.

19. A check writer comprising a printing couple, including a rotary platen and a rotary printing-wheel; supporting means for the printing-wheel journaled to oscillate; actuating means including a crank and connections to the platen for rotating the latter, and including connections to the supporting means for shifting the latter relatively to the platen; said supporting means carrying a device connecting with the actuating means for holding the printing-wheel from rotation during said shifting movement.

20. A check writer including a rotary platen and a rotary printing-wheel; a mounting for the printing-wheel enabling the latter to bodily oscillate; a mounting for the platen enabling the latter to reciprocate; means for actuating the printing-wheel and platen, including a connection for positively rotating the platen and positively moving the printing-wheel, and also including a connection for positively reversing the movement of the printing-wheel after the platen is disengaged therefrom.

21. A check writer comprising a printing-wheel; a carrier therefor; means by which the printing-wheel may rotate in the carrier; means by which the carrier may oscillate and carry the printing-wheel with it; a platen coöperating with the printing wheel; and means whereby the platen may engage the printing-wheel and then positively drive the same for printing and feeding a check.

22. A check writer having a printing-wheel journaled for oscillating movements; means for imparting one of the movements of oscillation to said printing-wheel; a platen coöperating with the printing-wheel; means for causing the platen to give the other movement of oscillation to the printing-wheel; and means for driving the platen into and out of engagement with the printing-wheel.

23. A check writer including in combination, a printing wheel, means for supporting said printing wheel whereby the same may be rotated and may be oscillated for printing, a platen coöperating with said printing wheel, means for supporting said platen, means for rotating said platen and for moving the same into and out of engagement with the printing wheel including a rotary shaft provided with flat and circular portions, a roller coöperating with said portions and yielding means tending to hold said shaft and roller in engagement.

24. A check writer having a printing-wheel; a carrier in which the printing-wheel is journaled to rotate; means for supporting the carrier so that it may oscillate; a detent supported by the carrier and coöperating with the printing-wheel to hold the same from rotation at predetermined intervals; and actuating means for the carrier, including a connection to the detent for operating the same for the purpose stated.

25. A check writer comprising a printing-wheel; a carrier therefor journaled to oscillate and in which the printing-wheel is journaled to rotate; a platen for coöperation with the printing-wheel; and means for rotating the platen and oscillating the carrier, including a train of mutilated gearing.

26. A check writer having a printing-wheel; a carrier journaled to oscillate, and in which carrier the printing-wheel is journaled to rotate; a platen for coöperation with the printing-wheel; and means to actuate the platen and carrier, including a driving-shaft and switch-cam for imparting movement to the carrier.

27. A check writer having in combination, a printing wheel, a platen associated therewith, means for moving said platen into engagement with the printing wheel and for rotating the platen for giving to the printing wheel a movement of oscillation in one direction for printing, devices operated by said means for rotating the platen for moving said printing wheel in the other direction of oscillation and for simultaneously moving said platen away from said printing wheel.

28. A check writer having a printing-wheel and a platen adapted to have rolling engagement with each other; and actuating means for the printing-wheel and platen, including means for moving the platen in substantially a right-line into engagement with the printing-wheel, rotating the platen so as to drive the printing-wheel, moving the platen in substantially a right-line away from the printing-wheel, and returning the printing-wheel to its initial, normal position of coöperation relatively to the platen.

29. A check writer comprising a carrier journaled to oscillate; a printing-wheel journaled in the carrier so as to rotate; a platen journaled so as to rotate; a crank-shaft and connections for causing the platen to rotate and the printing-wheel to oscillate, the axes of the platen, crank-shaft, and carrier being in the same vertical plane which also intersects the axis of the printing-wheel.

30. A check writer comprising a frame having upper and lower portions; a rotary platen journaled in the lower portion for rotation; a printing-wheel journaled in the upper portion for rotation and for oscillations relatively to the platen; means for rotating the platen and oscillating the printing-wheel; and independent means for rotating the printing-wheel relatively to the platen.

31. A check writer having in combination, a printing wheel, a platen associated therewith, means for moving said platen into engagement with the printing wheel and for rotating the platen for giving to the printing wheel a movement of oscillation in one direction for printing; devices operated by said means for rotating the platen for moving said printing wheel in the other direction of oscillation and for simultaneously moving said platen away from said printing wheel, an inking roller associated with said printing wheel, and an inking roller associated with said platen.

32. A check writer having a pair of printing members, one of which is adapted to rotate and reciprocate; and means for actuating the members, including means for momentarily retarding the rotary movement of the said rotary member during a movement of its reciprocation.

33. A check writer having a printing-wheel and a coöperating platen; means for rotating the printing-wheel; means for restraining the rotation of the printing-wheel, the latter including a detent; means for yieldingly actuating the detent in one direction; and means for positively actuating said detent in the same direction.

34. A check writer comprising a printing couple, one of the members of which is adapted to oscillate; means for actuating the printing couple, including means for regulating a movement of oscillation of the oscillating member.

35. In a check writer, the combination of a printing wheel having a convex periphery provided with a plurality of parallel lines of types of variable lengths, means for rotating said printing wheel to bring any desired line of type into printing position, means for supporting said printing wheel whereby the line of type may be moved endwise for printing, a movable platen coöperating with said line of type for holding the check in engagement with the type during printing, and means for moving the platen and printing wheel a distance corresponding to the length of the line of type printing plus the space desired between the printed characters and the next character to be printed.

BENJAMIN O. FANSLOW.